US011471000B2

(12) United States Patent
Nelson

(10) Patent No.: US 11,471,000 B2
(45) Date of Patent: Oct. 18, 2022

(54) TWO-SIDED GRILL WITH MOVABLE LOWER PLATE

(71) Applicant: TAYLOR COMMERCIAL FOODSERVICE, LLC, Rockton, IL (US)

(72) Inventor: Dennis J. Nelson, Rockford, IL (US)

(73) Assignee: TAYLOR COMMERCIAL FOODSERVICE, LLC, Rockton, IL (US)

(*) Notice: Subject to any disclaimer, the term of this patent is extended or adjusted under 35 U.S.C. 154(b) by 578 days.

(21) Appl. No.: 16/523,515

(22) Filed: Jul. 26, 2019

(65) Prior Publication Data

US 2019/0343328 A1 Nov. 14, 2019

Related U.S. Application Data

(63) Continuation of application No. 14/695,127, filed on Apr. 24, 2015, now Pat. No. 10,390,655.

(60) Provisional application No. 61/983,555, filed on Apr. 24, 2014.

(51) Int. Cl.
*A47J 31/06* (2006.01)
*A47J 37/06* (2006.01)

(52) U.S. Cl.
CPC .... *A47J 37/0611* (2013.01); *A47J 2037/0617* (2013.01)

(58) Field of Classification Search
CPC .............. A47J 37/0611; A47J 2037/0617
USPC ........................................ 99/375
See application file for complete search history.

(56) References Cited

U.S. PATENT DOCUMENTS

| | | | |
|---|---|---|---|
| 2,040,479 A | | 5/1936 | Glore |
| 3,245,337 A | * | 4/1966 | White ............. A47J 37/0611 |
| | | | 219/442 |
| 3,407,723 A | * | 10/1968 | Varkala ............. A47J 37/10 |
| | | | 99/425 |
| 3,427,955 A | | 2/1969 | Menzin |
| 3,880,064 A | | 4/1975 | Martinez |
| 4,119,021 A | | 10/1978 | Moses |
| 4,586,428 A | | 5/1986 | Adamson |
| 4,715,357 A | | 12/1987 | Sherman et al. |
| 4,972,766 A | | 11/1990 | Anetsberfer |
| 5,247,874 A | | 9/1993 | George, II et al. |
| 5,341,727 A | | 8/1994 | Dickson |

(Continued)

FOREIGN PATENT DOCUMENTS

| | | |
|---|---|---|
| CN | 204016024 U | 12/2014 |
| GB | 2 458 897 A | 10/2009 |
| WO | WO 2014/144335 A1 | 9/2014 |

*Primary Examiner* — Reginald Alexander
(74) *Attorney, Agent, or Firm* — Barnes & Thornburg LLP

(57) ABSTRACT

A grill is provided including a base structure. An upper platen assembly is connected to the base structure and includes an upper gritting plate. A lower platen assembly is connected to the base structure and includes a lower grilling plate. A plurality of leveling mechanisms is mounted to the base structure and arranged in contact with the lower grilling plate. The leveling mechanisms are configured to move the lower gritting plate relative to the upper grilling plate. At least one grease receptacle has an inboard sidewall and an outboard sidewall connected by a compartment configured to receive grease from a grilling surface of the lower plate. The inboard sidewall is mounted to the lower grilling plate at or below the grilling surface.

16 Claims, 5 Drawing Sheets

(56) References Cited

U.S. PATENT DOCUMENTS

| | | |
|---|---|---|
| 5,640,895 A | 6/1997 | Anetsberger |
| 5,791,234 A | 8/1998 | Newton et al. |
| 5,839,359 A | 11/1998 | Gardner |
| 5,910,207 A | 6/1999 | Newton et al. |
| 6,016,743 A | 1/2000 | Glavan |
| 6,089,144 A | 7/2000 | Garber et al. |
| 6,205,995 B1 | 3/2001 | Odenwald |
| 6,257,126 B1 | 7/2001 | Veljkovic et al. |
| 7,131,549 B2 | 11/2006 | Hook |
| 7,448,373 B2 | 11/2008 | Hill et al. |
| 7,472,645 B2 | 1/2009 | Hill et al. |
| 7,913,615 B2 | 3/2011 | Calzada et al. |
| 7,971,521 B2 | 7/2011 | Martinez |
| 8,100,051 B2 | 1/2012 | Scholz et al. |
| 9,861,230 B2 | 1/2018 | Freymiller et al. |
| 9,927,382 B2 | 3/2018 | Freymiller et al. |
| 10,010,218 B2 | 7/2018 | Sands et al. |
| 10,098,499 B2 | 10/2018 | Nelson |
| 10,117,545 B2 | 11/2018 | Nelson et al. |
| 10,159,379 B2 | 12/2018 | Nelson |
| 10,213,050 B2 | 2/2019 | Freymiller et al. |
| 10,327,588 B2 * | 6/2019 | Dahle .................. A47J 37/0786 |
| 2011/0177215 A1 | 7/2011 | Bartlett et al. |
| 2013/0071534 A1 | 3/2013 | Newton |
| 2014/0014087 A1 * | 1/2014 | Rosa ................... A47J 37/0704 126/25 R |
| 2014/0026764 A1 | 1/2014 | Sykes et al. |
| 2015/0108110 A1 | 4/2015 | Freymiller et al. |
| 2015/0305554 A1 | 10/2015 | Dorsten et al. |
| 2015/0305555 A1 | 10/2015 | Nelson |
| 2015/0305557 A1 | 10/2015 | Nelson |
| 2016/0037967 A1 | 2/2016 | Glavan et al. |
| 2016/0045066 A1 | 2/2016 | Sands et al. |
| 2016/0309941 A1 | 10/2016 | Minard |
| 2016/0381740 A1 | 12/2016 | D'Andrea et al. |
| 2018/0360269 A1 | 12/2018 | Sands et al. |
| 2019/0038073 A1 | 2/2019 | Nelson |
| 2019/0045972 A1 | 2/2019 | Freymiller et al. |
| 2019/0059643 A1 | 2/2019 | Minard et al. |
| 2019/0075966 A1 | 3/2019 | Kelly |
| 2019/0104885 A1 | 4/2019 | Pahnke et al. |
| 2019/0117019 A1 | 4/2019 | Minard |

* cited by examiner

TWO-SIDED GRILL WITH MOVABLE LOWER PLATE

CROSS-REFERENCE TO RELATED APPLICATION

This application is a continuation of U.S. patent application Ser. No. 14/695,127, filed on Apr. 24, 2015 which claims the benefit of U.S. provisional patent application Ser. No. 61/983,555 filed Apr. 24, 2014, the entirety of each are incorporated herein by reference herein.

BACKGROUND OF THE INVENTION

The present invention relates generally to a grill, and more particularly to a grill having a movable lower grill plate having a latch to secure and upper plate and movable grease receptacles.

Grills or griddles are used to cook various foods, such as hamburgers for example. In some conventional grills, the sides of the food are grilled sequentially. The food is placed on a grilling surface, thus grilling the side of the food that contacts the grilling surface. After that side of the food is cooked, the food is manually flipped to cook the opposite side. After both sides of the food are cooked, the food is manually removed from the grill for serving.

Other conventional grills, such as clamshell grills for example, are capable of simultaneously cooking two sides of various food items, such as hamburger patties, sausage patties, chicken, or other foods. In particular, clamshell grills are often used in commercial establishments, such as fast-food restaurants for example, because they reduce overall cooking time and the amount of operator attention required for cooking.

A conventional clamshell grill generally includes an upper platen assembly movably connected to a lower platen assembly. For example, the upper platen assembly may be pivotally coupled to the lower platen assembly for movement between a lower cooking position overlying the lower platen assembly and a raised position inclined upwardly from the lower platen assembly. When the upper platen assembly is in the lowered cooking position, a gap is created between the upper and lower platen assemblies. This gap is generally adjustable according to the thickness of the food being cooked. For example, hamburger patties are preformed in several different sizes (i.e. a quarter pound patty has a greater thickness than a regular patty). To cook the food, an operator selects the gap size and a cooking time via an operator interface for the food item being cooked.

One problem with conventional clamshell grills is that the compression force applied by the upper platen assembly on the food being cooked is limited to the weight of the platen. In addition, the components configured to level the upper platen assembly are positioned generally above the upper platen assembly. As a result, the leveling components are arranged within a high temperature area, and the excessive heat can affect the reliability and operation of the leveling component.

BRIEF DESCRIPTION OF THE INVENTION

According to an embodiment of the invention, a grill is provided including a base structure. An upper platen assembly is connected to the base structure and includes an upper grilling plate. A lower platen assembly is connected to the base structure and includes a lower grilling plate. A plurality of leveling mechanisms is mounted to the base structure and arranged in contact with the lower grilling plate. The leveling mechanisms are configured to move the lower grilling plate relative to the upper grilling plate. At least one grease receptacle has an inboard sidewall and an outboard sidewall connected by a compartment configured to receive grease from a grilling surface of the lower plate. The inboard sidewall is mounted to the lower grilling plate at or below the grilling surface.

According to another embodiment of the invention, a grill is provided including a base structure. An upper platen assembly movable connected to the base structure such that the upper platen assembly is movable between a raised position and a lowered position. The upper platen assembly includes an upper grilling plate, a handle, and an arm. A lower platen assembly connected to the base structure includes a lower grilling plate. A plurality of leveling mechanisms are mounted to the base structure and arranged in contact with the lower grilling plate. The plurality of leveling mechanisms is configured to move the lower grilling plate relative to the upper grilling plate. A latch mechanism is mounted to the base structure and is configured to selectively couple to the arm to retain the upper platen assembly in the lowered position.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
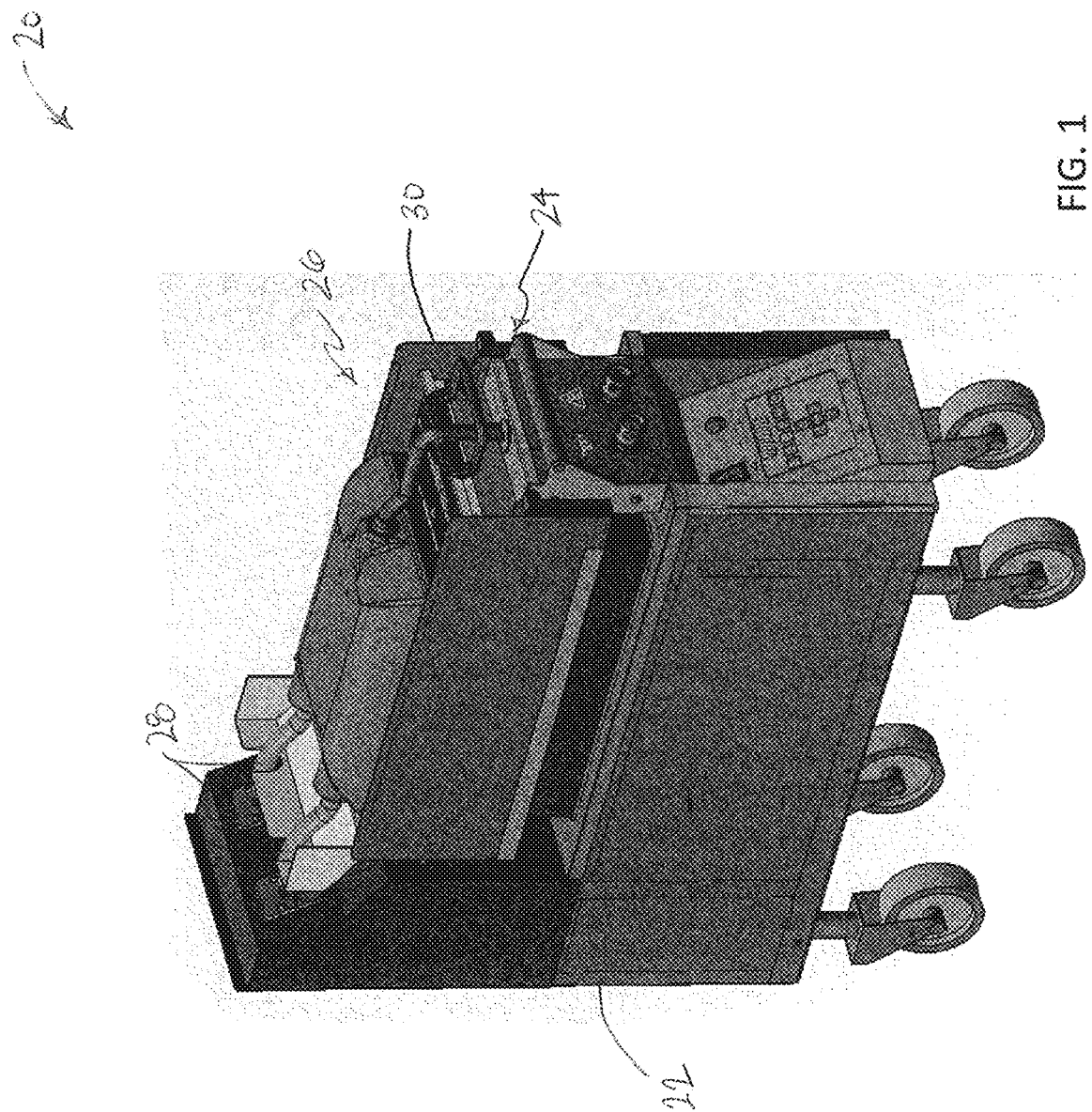
FIG. 1 schematically illustrates a perspective view of a grill in a lowered position according to an embodiment of the invention.

Referring now to the FIGS., a grill 20 is illustrated having a rigid base structure 22 supporting a lower platen assembly 24 and an upper platen assembly 26. The upper platen assembly 26 may be fixed relative to the base structure 22 or alternatively, may be movably attached to the base structure 22 with a mounting structure 28 such that the upper platen assembly 26 is configured to move between a lowered, cooking position (FIG. 5a) and an upper raised position (FIG. 5b) relative to the lower platen assembly 24. In one embodiment, the mounting structure 28 is a hinge such that the upper platen assembly 26 is configured to pivot relative to the lower platen assembly 24; however, in other embodiments, the upper platen assembly 26 may be vertically lowered and raised in a generally linear motion. The upper platen assembly 26 may be moved between the raised and lowered positions either automatically or manually. In embodiments where the upper platen assembly 26 is moved manually, the upper platen assembly 26 may include a handle 30 that can be grabbed by an operator to move the upper platen assembly 26 between the raised and lowered positions. When the upper platen assembly 26 is lifted by an operator to the raised position, the grilling surface 33 of the lower platen assembly 24 is exposed.

The lower platen assembly 24 includes a lower grilling plate 32 and the upper platen assembly 26 includes an upper grilling plate 34. Food items are placed on an exposed grilling surface 33 of the lower grilling plate 32 by the operator for cooking. The operator moves the upper platen assembly 26, such as via handle 30 for example, to the lowered position such that the one or more food items to be cooked are positioned within a gap 36 formed between the upper and lower grilling plates 32, 34.

Figure 4:
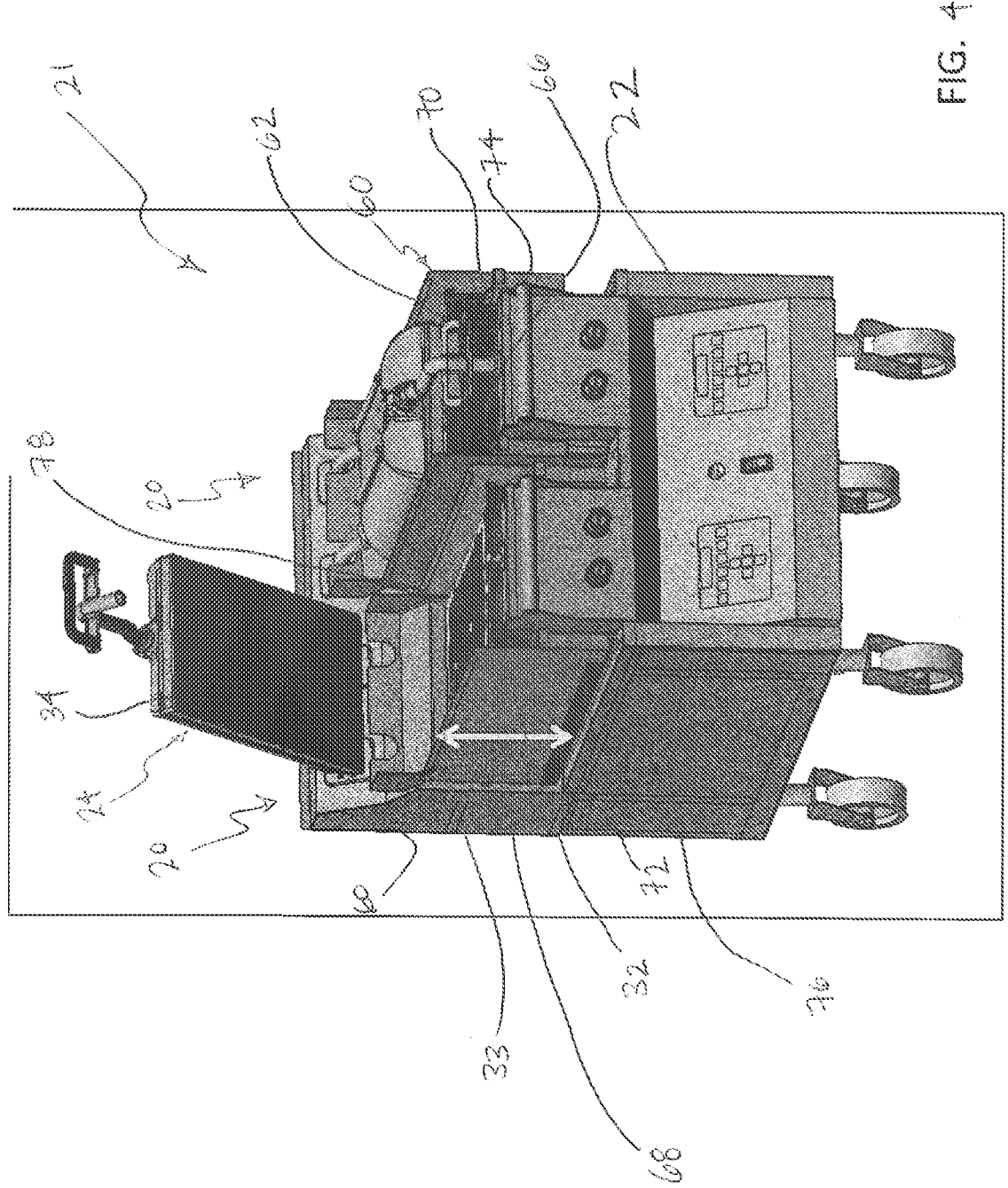
FIG. 4 schematically illustrates a perspective view of a grill having one or ore grease receptacles according to an embodiment of the invention.

The lower grilling plate 32 is configured to provide heat to the lower side of one or more food items placed thereon and the upper grilling plate 34 is configured to provide heat to an upper side of the food items located on the lower grilling plate 32. The upper and lower grilling plates 32, 34 are heated by a heater (not shown) to cook the food items. In order to transmit heat to the food items cooked by the grill, the lower and upper grilling plates 32, 34, respectively, may be formed of a heat-conducting material, such as cast aluminum, abrasion-resistant steel, cast iron, stainless steel, mild steel, a ceramic material, or other suitable heat conducting materials used in grills. Although the lower and upper grilling plates 32, 34 are shown as having a rectangular shape, one or both of the grilling plates 32, 34 may also be formed into other shapes, such as circular or oval shapes for example. As illustrated in FIG. 4, a plurality of individual grills 20 may be arranged adjacent one another to form a grill assembly 21. In one embodiment, a portion of each grill 20, such as the base structure 22 for example, is integrally formed.

Figure 2:
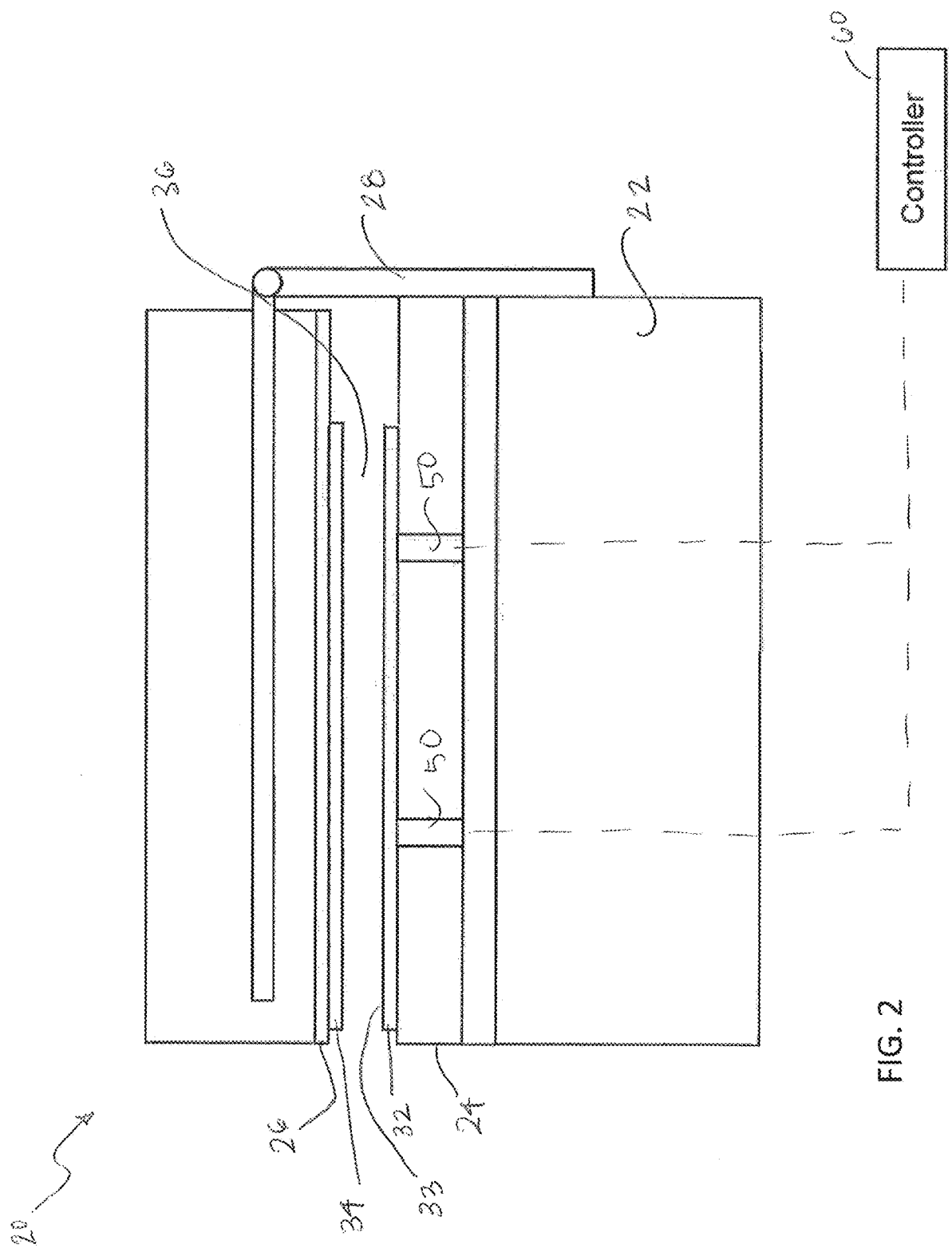
FIG. 2 schematically illustrates a cross-sectional view of a grill according to an embodiment of the invention.
Figure 3:
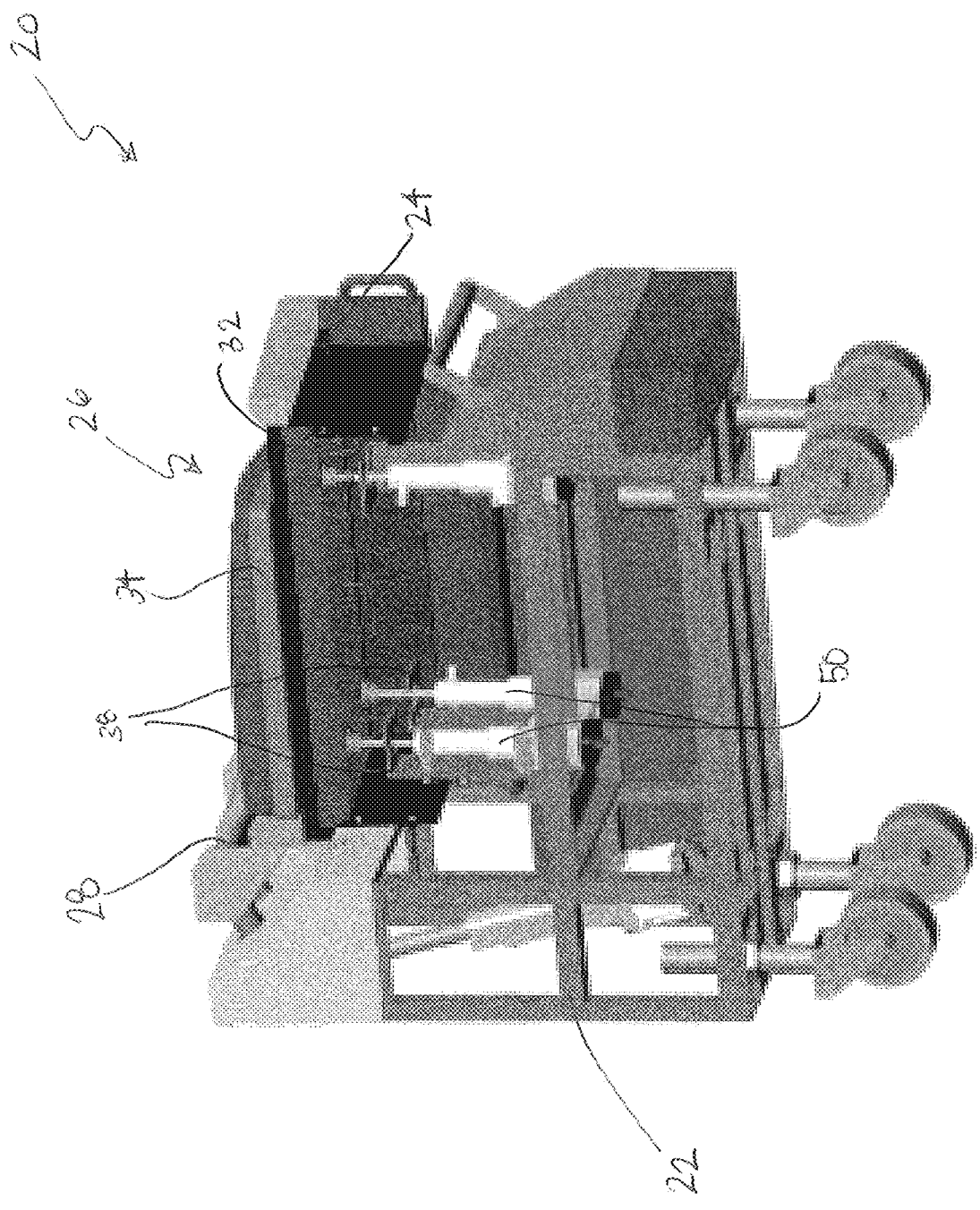
FIG. 3 schematically illustrates a perspective view of a grill having a portion of the base structure removed according to an embodiment of the invention.

As shown in FIGS. 2-3, the lower platen assembly 24 includes a plurality of leveling mechanisms 50 for controlling the tilt, angle, and/or attitude of the lower grilling plate 32. Although three leveling mechanisms 50 are illustrated in the FIGS., embodiments having any number of leveling mechanisms 50 are within the scope of the invention. A portion of each leveling mechanism 50 is connected to the base structure 22, such as with a mounting bracket for example 38, and a first end 52 of each leveling mechanism 50 is connected to the lower grilling plate 32. The first ends 52 may be positioned about a peripheral region of the lower grilling plate 32. It is to be understood that the first end 52 of the leveling mechanisms 50 do not need to be positioned at an edge of the lower grilling plate 32. Rather, a person having ordinary skill in the art would understand that the peripheral region encompasses the portion of the lower grilling plate 32 that allows suitable control of the position of the lower grilling plate 32 by the extension or retraction of the leveling mechanisms 50.

A control 60 is configured to independently operate each of the plurality of leveling mechanisms 50. As a result, the tower grilling plate 32 may be arranged in a non-horizontal configuration. In one embodiment, the leveling mechanisms 50 are linear actuators, such as hydraulic, pneumatic, or mechanical actuators for example. One or more sensors (not shown) are configured to monitor each of the plurality of leveling mechanisms 50 and detect when the lower grilling plate 32 contacts the upper grilling plate 34. In one embodiment, the sensors are Hall Effect sensors or encoders configured to monitor the position of a movable portion 54 of the leveling mechanisms 50 and determine when each leveling mechanism 50 reaches a stall position. Alternatively, other types of sensors, such as sensors configured to monitor current, load, or another characteristic of the plurality of leveling mechanisms 50 for example, is also within the scope of the invention. Through the leveling mechanisms 50, the position of the lower grilling plate 32 and/or the initial gap between the lower and upper grilling plates 32, 34, respectively, may be adjusted to accommodate the variation of thickness of the food items to be cooked on the grill 20. Moreover, the plurality of leveling mechanisms 50 may apply a positive pressure on the lower grilling plate 32 and consequently on the food items as they are being cooked on the grill 20.

The grill 20 may be automatically calibrated to ensure that the gap 36 between the lower grilling plate 32 and the upper grilling plate 34 is maintained at a desired size. By calibrated, it is meant that the upper grilling plate 34 and the lower grilling plate 32 are level to one another to ensure proper cooking of food items. In one example, the gill 20 is calibrated daily to correct any unleveling of the lower grilling plate 32 that may have occurred during the previous day.

Referring now to FIG. 4, the grill 20 includes at least one removable grease receptacle 60. The grease can 60 is configured to mate with the lower platen assembly 24 along an outboard side/edge 62 thereof. This allows grease and/or debris to drain or be swept directly from the cooking surface 33 of the lower grilling plate 32 into the grease can 60. In the illustrated, non-limiting embodiment, identical grease cans 60 are arranged at the respective left and right edges 62, 64 of the lower grilling plate 32. Each grease can 60 acts as a grease collection channel and has an inboard sidewall 66 and an outboard sidewall 68 separated therefrom by a chamber or compartment 70 that receives the grease and debris. The chamber or compartment 70 is further defined by first and second end walls 72, 74, and a base 76 of the grease can 60. The exemplary grease can 60 may be made from a bent or welded piece of sheet metal, such as stainless steel for example.

When the grease can 60 is installed, the upper edge 78 of the inboard sidewall 66 rests below a portion of the cooking surface 33 of the lower cooking plate 32 adjacent the associated edge 62, 64, respectively. This allows grease, food, and the like to be scraped from the grill 20 into the compartment 70. The outboard sidewall 68 protrudes above the inboard sidewall 66 and above the cooking surface 33 to serve as a splatter guard for grease that may splatter during cooking or when being scraped from the grill 20. By mounting the grease cans 60 directly to the movable lower grilling plate 32, the grease cans 60 are configured to move in conjunction with the lower plate 32 and prevent cross-contamination of adjacent cook zones of the grill. In addition, by mounting the at least one grease can 60 to the lower grilling plate 32, the outboard sidewall 68 of the grease can 60 does not need to be extended to provide splatter protection when the lower grilling plate 32 is in a lowered position.

Figure 5B:
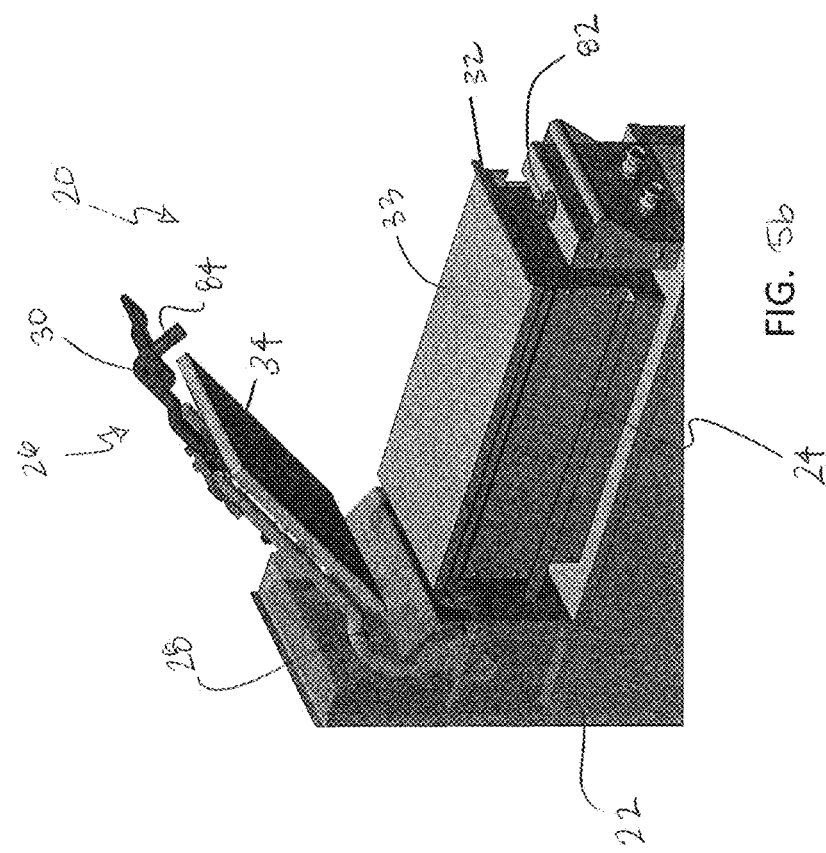
FIGS. 5a and 5b schematically illustrates a perspective view of having an latch mechanism according to an embodiment of the invention.
Figure 5A:
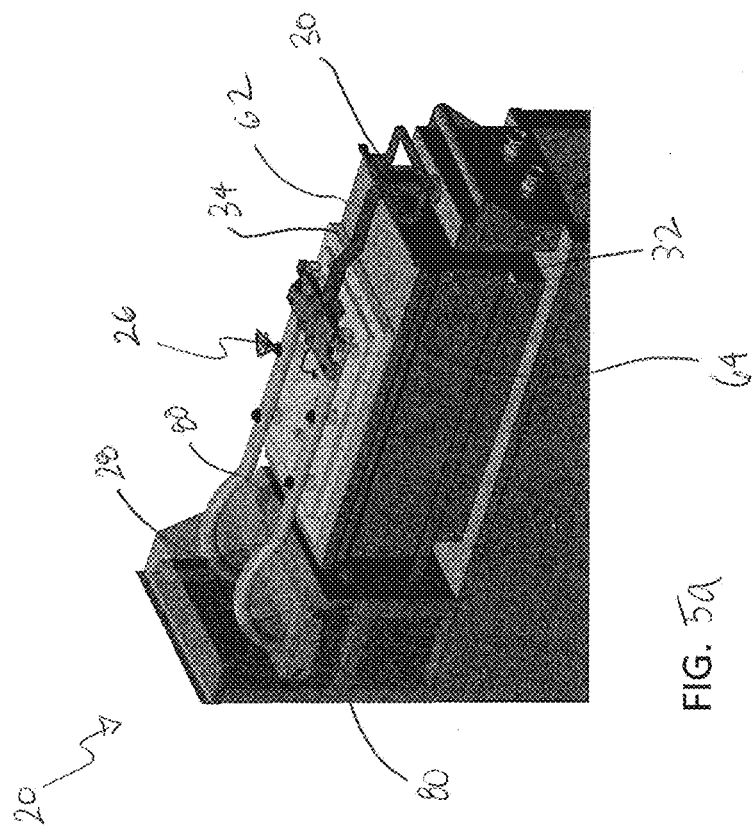

Referring now to FIGS. 5a and 5b, the upper platen assembly 26 is illustrated in more detail. A portion of the mounting structure 28 connected to the base 22 includes at least one bearing 80, such as two bearings 80 for example, such that the upper platen assembly 26 freely rotates relative to the base structure 22. The handle 30 extending from the upper platen assembly 26 can be grabbed by an operator to pivot the upper platen assembly 26 between the lowered position and the raised position. A latch mechanism 82, such as a magnet for example, is connected to or integrally formed with the base structure 22 near the handle 30. An arm 84 extending from the upper platen assembly 26 is configured to connect either mechanically, electrically, or magnetically to the latch mechanism 82 when the upper platen assembly 26 is in the lowered position. The arm 84 and the handle 30 may be integrated into a one-piece construction as illustrated in the FIG., or alternatively, they may be separately provided. Although the arm 84 and latch mechanism 82 are illustrated near the front of the grill 20, embodiments where the arm 84 and latch mechanism 82 are coupled at another location, such as adjacent a side 62, 64 or near the back of the grill 20 are within the scope of the invention. In one embodiment, the upper platen assembly 26 is configured to latch to the base structure 22 at both the front and the back of the grill 20 to allow for additional stability.

When the arm 84 and the latch mechanism 82 are coupled, the latch mechanism 82 locks the upper platen assembly 26 in place and limits movement from the lowered position to the raised upper position. In one embodiment, a biasing mechanism (not shown), such as a torsion spring for example, is connected to the mounting structure 28 of the upper platen assembly 26, for example near the bearings 80. When the arm 84 and the latch mechanism 82 are decoupled, the biasing mechanism biases the upper platen assembly 26 from the lowered position to the raised position. The arm 84 on the upper platen assembly 26 and the latch mechanism 82 may be separable either manually or automatically, such as by a button (not shown) that moves or deactivates the latch mechanism 82. In one embodiment, the latch mechanism 82 is configured to automatically decouple from the arm 84 such that the upper platen assembly 26 is biased away from the lower platen assembly 24 in the event of power loss.

By including a latch mechanism 82, the upper platen assembly 26 may be fixed to the base structure 22 in the lowered position. This is particularly useful for a grill 20 having a movable lower grill plate 32 because the upper platen assembly 26 cannot rotate in response to the pressure applied by the lower platen assembly 24. Movement of the lower grill plate 32 applies a compression force to the food positioned between the upper and lower grill plates 32, 34. This increase in compression force may be used to generate a better sear on the food items being cooked.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A grill comprising:
    a base structure;
    a lower platen assembly connected to the base structure and including a lower grilling plate;
    an upper platen assembly movably connected to the base structure such that the upper platen assembly is movable between a raised position and a lowered position, the upper platen assembly including an upper grilling plate, a handle, and an arm;
    a plurality of leveling mechanisms, each being mounted to the base structure and arranged in contact with the lower grilling plate, the plurality of leveling mechanisms being configured to move the lower grilling plate relative to the upper grilling plate,
    a latch mechanism mounted to the base structure, the latch mechanism being configured to selectively couple to the arm to retain the upper platen assembly in the lowered position and
    at least one grease receptacle having an inboard sidewall and an outboard sidewall connected by a compartment configured to receive grease from a grilling surface of the lower grilling plate, the inboard sidewall being mounted to the lower grilling plate at or below the grilling surface; wherein the at least one grease receptacle is configured to move with the lower grilling platen,
    wherein a first grease receptacle is mounted adjacent a first edge of the lower grilling plate and a second grease receptacle is mounted to adjacent a second edge of the lower grilling plate, the second edge being arranged opposite the first edge.

2. The grill according to claim 1, wherein the latch mechanism and the arm are mechanically coupled.

3. The grill according to claim 1, wherein the latch mechanism and the arm are electrically coupled.

4. The grill according to claim 1, wherein the latch mechanism and the arm are magnetically coupled.

5. The grill according to claim 1, wherein the arm and handle are integrally formed.

6. The grill according to claim 1, wherein the latch mechanism is integrally formed with the base structure.

7. The grill according to claim 1, wherein the latch mechanism is configured to decouple from the arm if the grill loses power.

8. The grill according to claim 1, wherein the upper platen assembly is pivotally connected to the base structure with a mounting structure, the mounting structure including at least one biasing mechanism configured to bias the upper platen assembly into the raised position.

9. The grill according to claim 1, wherein the latch mechanism is configured to selectively coupled the upper platen assembly to the base structure adjacent a front of the grill.

10. The grill according to claim 9, wherein the latch mechanism is additionally configured to selectively couple the upper platen assembly to the base structure adjacent a rear of the grill.

11. The grill according to claim 1, wherein the outboard sidewall protrudes above the inboard sidewall.

12. A grill comprising:
    a base structure;
    an upper platen assembly connected to the base structure, the upper platen assembly including an upper grilling plate;
    a lower platen assembly connected to the base structure and including a lower grilling plate;
    a plurality of leveling mechanisms, each being mounted to the base structure and arranged in contact with the lower grilling plate, the plurality of leveling mechanisms being configured to move the lower grilling plate relative to the upper grilling plate; and
    at least one grease receptacle having an inboard sidewall and an outboard sidewall connected by a compartment configured to receive grease from a grilling surface of the lower grilling plate, the inboard sidewall being mounted to the lower grilling plate at or below the grilling surface; wherein the at least one grease receptacle is configured to move with the lower grilling platen, wherein a first grease receptacle is mounted adjacent a first edge of the lower grilling plate and a second grease receptacle is mounted to adjacent a second edge of the lower grilling plate, the second edge being arranged opposite the first edge.

13. The grill according to claim 12, wherein the compartment is defined by a first end wall, a second end wall, and a base.

14. The grill according to claim 12, wherein the outboard sidewall protrudes above the inboard sidewall.

15. A grill comprising:
a base structure;
an upper platen assembly connected to the base structure, the upper platen assembly including an upper grilling plate;
a lower platen assembly connected to the base structure and including a lower grilling plate;
a plurality of leveling mechanisms, each being mounted to the base structure and arranged in contact with the lower grilling plate, the plurality of leveling mechanisms being configured to move the lower grilling plate relative to the upper grilling plate; and
at least one grease receptacle having an inboard sidewall and an outboard sidewall connected by a compartment configured to receive grease from a grilling surface of the lower grilling plate, the inboard sidewall being mounted to the lower grilling plate at or below the grilling surface; wherein the at least one grease receptacle is configured to move with the lower grilling platen, wherein the outboard sidewall protrudes above the inboard sidewall.

16. The grill of claim 15, wherein the compartment is defined by a first end wall, a second end wall, and a base.

* * * * *